United States Patent
Yu et al.

(10) Patent No.: US 9,274,304 B2
(45) Date of Patent: Mar. 1, 2016

(54) CAMERA LENS ASSEMBLY

(71) Applicant: Samsung Electronics Co., Ltd, Gyeonggi-do (KR)

(72) Inventors: Hyun-Ho Yu, Seoul (KR); Doo-Sik Shin, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 190 days.

(21) Appl. No.: 13/940,134

(22) Filed: Jul. 11, 2013

(65) Prior Publication Data

US 2014/0016218 A1   Jan. 16, 2014

(30) Foreign Application Priority Data

Jul. 11, 2012   (KR) .................. 10-2012-0075531

(51) Int. Cl.
| | |
|---|---|
| G02B 7/02 | (2006.01) |
| G02B 7/04 | (2006.01) |
| G03B 3/10 | (2006.01) |
| G03B 17/12 | (2006.01) |
| H04N 5/225 | (2006.01) |

(52) U.S. Cl.
CPC .. *G02B 7/04* (2013.01); *G03B 3/10* (2013.01); *G03B 17/12* (2013.01); *H04N 5/2254* (2013.01); *H04N 5/2257* (2013.01)

(58) Field of Classification Search
USPC ........................................ 359/811, 823, 824
See application file for complete search history.

(56) References Cited

U.S. PATENT DOCUMENTS

| | | | |
|---|---|---|---|
| 7,589,920 | B2 | 9/2009 | Shin et al. |
| 7,944,629 | B2 | 5/2011 | Shin |
| 2002/0041563 | A1 | 4/2002 | Shinozuka et al. |
| 2012/0106936 | A1 | 5/2012 | Lim et al. |

FOREIGN PATENT DOCUMENTS

| | | |
|---|---|---|
| EP | 2219365 A2 | 8/2010 |
| KR | 10-0665282 | 12/2006 |
| KR | 10-2007-0065474 | 6/2007 |
| KR | 10-0798867 | 1/2008 |
| KR | 10-0849580 | 7/2008 |
| KR | 10-2009-0128825 | 12/2008 |
| KR | 10-1058679 | 8/2011 |

OTHER PUBLICATIONS

Extended European Search Report dated Nov. 4, 2013 in connection with European Patent Application No. 13175714.8, 8 pages.

*Primary Examiner* — Jack Dinh (57) ABSTRACT

A camera lens assembly includes: a lens holder unit to which a lens module is mounted; a wire member fixed to the lens holder unit and the lens module, and resiliently supporting the lens module such that the lens module is driven in an optical axis direction; and a fixing member mounted to the lens holder unit to fix the wire member and dampen an impact generated in the wire member due to an impact generated in a direction perpendicular to the optical axis direction. Also, a camera lens assembly can include: a wire module resiliently supporting a lens module such that the lens module is movable in an optical axis direction on a lens holder unit, dampening an impact generated in a direction perpendicular to the optical axis direction, and transferring a current applied to drive the lens module to a circuit board.

20 Claims, 6 Drawing Sheets

CAMERA LENS ASSEMBLY

CROSS-REFERENCE TO RELATED APPLICATION(S) AND CLAIM OF PRIORITY

The present application is related to and claims priority under 35 U.S.C. §119(a) to Korean Application Serial No. 10-2012-0075531, which was filed in the Korean Intellectual Property Office on Jul. 11, 2012, the entire content of which is hereby incorporated by reference.

TECHNICAL FIELD

The present disclosure relates generally to a camera lens assembly, and more particularly, to a camera lens assembly which has a simplified structure, can support a lens module, and can dampen an impact applied to the lens module.

BACKGROUND

In recent years, small-sized, light-weighted camera lens assemblies appear due to development of the digital camera manufacturing technology. Thus, as cameras are included within mobile communication terminals, portable terminals within which optical lenses and camera devices are included are becoming generalized. At an initial stage when cameras started to be included within portable terminals, the performances of the cameras part of the portable terminals were significantly lower than the digital cameras commercialized those days. For example, in those days when the performances of the distributed digital cameras corresponded to 4 megapixels, the cameras within the mobile communication cameras generally corresponded to 0.3 megapixels, and the cameras within high-class terminals merely corresponded to 1 megapixels. Currently, as precision of camera lens assemblies have improved, portable terminals, to which cameras having a performance corresponding to 5 megapixels or more, are included are being commercialized.

The focal distance of such a camera lens module represents a distance between a lens and an image forming surface, and varies according to a distance between the lens and a subject. Accordingly, in order to obtain an optimum resolution, a distance between a lens module and an image sensor needs to be changed according to the distance of the photographed subject. In particular, when a high definition image having a high resolution is to be be obtained, apparatuses for correcting the focal distance are essentially mounted. Such focal distance correcting apparatuses are classified as manual focus correcting apparatuses (for manually correcting a focus by a photographing person) and as automatic focus correcting apparatuses (for automatically correcting a focus by an apparatus provided in a camera lens module).

The camera lens assemblies according to the related art are disclosed in Korean Patent No. 10-0849580 filed by the applicant (registered on Jul. 24, 2008 and titled 'Camera Lens Assembly') and Korean Patent No. 10-1058679 (registered on Aug. 16, 2011 and titled 'Camera Lens Assembly'). Because the existing camera lens assembly is of a type in which upper and lower plate springs are fixed to a housing, structure the existing camera lens assembly is complex, and circuits for driving the camera lens assembly need to be provided on a lower surface and a side surface the existing camera lens assembly, making it difficult to assemble the camera lens assembly. Further, a camera lens is provided on the front or rear surface of the portable terminal, and impacts are often generated in a side surface direction rather than in a direction perpendicular to the lens. That is, when the portable terminal is dropped, an impact is applied to a side surface of the lens, often causing deformation or damage in the side surface direction of the lens. As a result of the deformation or damage, a defect is generated in an image and exchange costs are generated.

Thus, in particular, a camera lens assembly provided in an small-sized electronic device such as a portable terminal, which can realize small size and low price while maintaining a high definition image quality, is demanded. In addition, a camera lens assembly which can be simply assembled and structured, has a power source to easily supply power, and has a high reliability against an external impact is demanded.

SUMMARY

To address the above-discussed deficiencies, embodiments of the present disclosure provide a camera lens assembly mounted to a small-sized electronic device such as a portable terminal, which can simplify a fixing structure thereof, and has a simple structure, and can be easily assembled while maintaining a high definition image quality.

Certain embodiments of the present disclosure include a camera lens assembly that has a high reliability against being damaged or deformed by an impact, the impact to be prevented from being transferred to the camera lens assembly, the impact due to an impact generated in the camera lens assembly or a dropping of a small sized electronic device.

Certain embodiments of the present disclosure include a method for generating a pattern in a display apparatus. The method includes a camera lens assembly including: a lens holder unit to which a lens module is mounted; a wire member fixed to the lens holder unit and the lens module, and resiliently supporting the lens module such that the lens module is driven in an optical axis direction; and a fixing member fitted within the lens holder unit to fix the wire member and dampen an impact generated in the wire member due to an impact generated in a direction perpendicular to the optical axis direction.

Certain embodiments of the present disclosure include a camera lens assembly including: a wire module resiliently supporting a lens module such that the lens module is movable in an optical axis direction on a lens holder unit, damping an impact generated in a direction perpendicular to the optical axis direction, and transferring a current applied to drive the lens module to a circuit board.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, a camera lens assembly of the present disclosure will be described with reference to the accompanying drawings. In the specification, the thicknesses of lines and the sizes of constituent elements illustrated in the drawings may be exaggerated for clarity and convenience of the description. Further, the following terms are those defined, according to the functions of the present disclosure, and may be changed according to the intentions of the user's customs. Therefore, the definitions of the terms should be made based on the contents of the specification. Further, although ordinal numbers such as first and second are used in the description of the embodiments, they are only to help distinguish the objects having the same name, and thus the order of ordinal numbers may be determined arbitrarily and the prior description may be applied correspondingly to the object of the lower order.

The present disclosure includes a camera lens assembly, in particular, a camera lens assembly in a small-sized electronic device such as a portable terminal. The present disclosure includes a camera lens assembly in which a lens module is fixed by a wire structure, and auto focusing is performed by the wire fixing structure. The present disclosure also includes a camera lens assembly which reduces an impact generated in the camera lens assembly having a wire fixing structure. More particularly, present disclosure includes a camera lens assembly that, upon an impact generated in a direction perpendicular to an optical axis of the camera lens assembly, prevents deformation of or damage to the camera lens module and deformation of or damage to the wire member of the wire fixing structure. The present disclosure also includes a camera lens assembly including a wire structure provided such that a current flows between a driving unit (for providing a driving force so that auto focusing of the lens module is performed) and a circuit board (for providing the driving unit with electric power).

Accordingly, the camera lens assembly of the present disclosure is described with reference to FIGS. 1 to 7.

Figure 1:
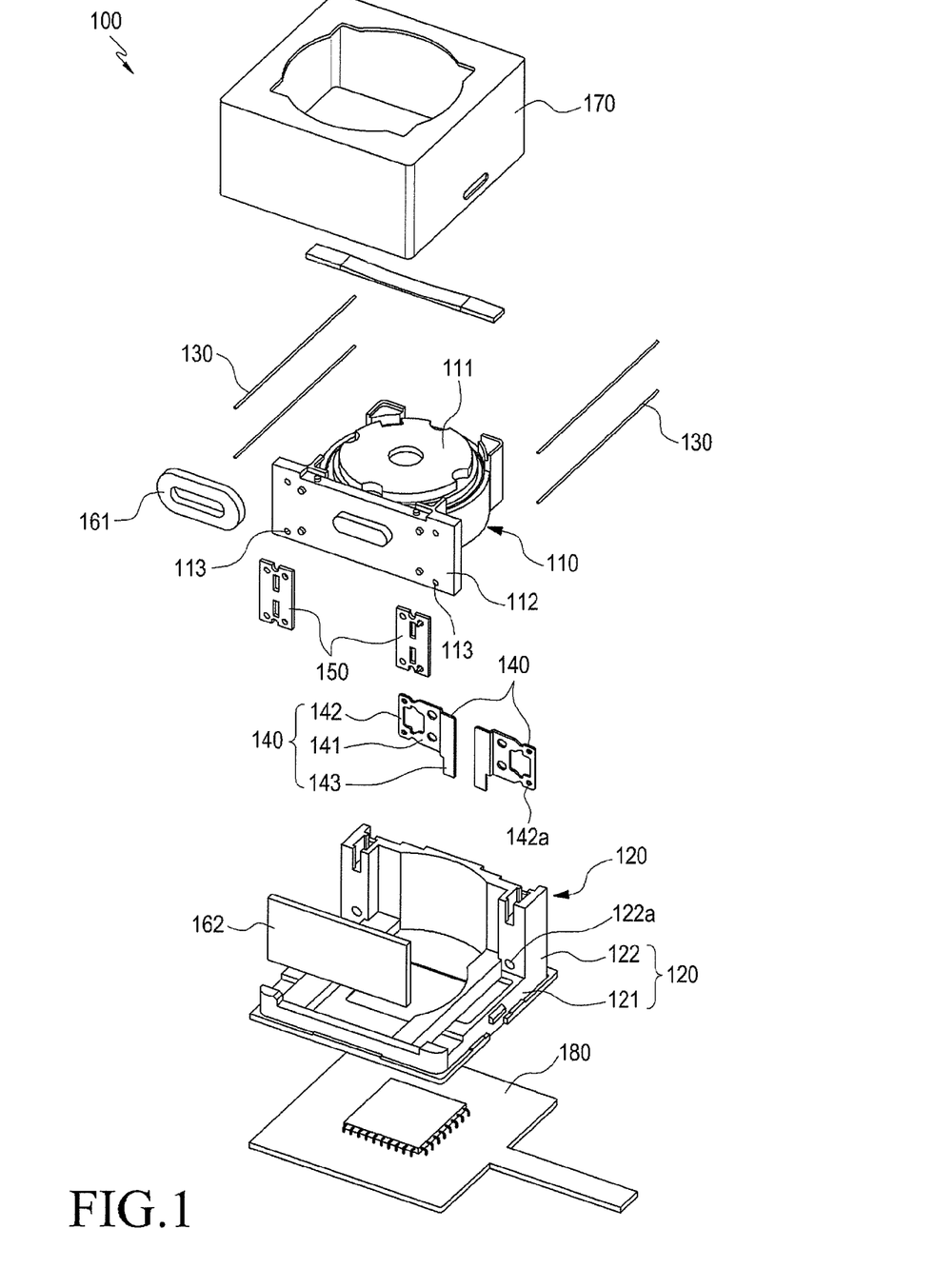
FIG. 1 illustrates an exploded perspective view of a camera lens assembly according to embodiments of the present disclosure.
Figure 2:
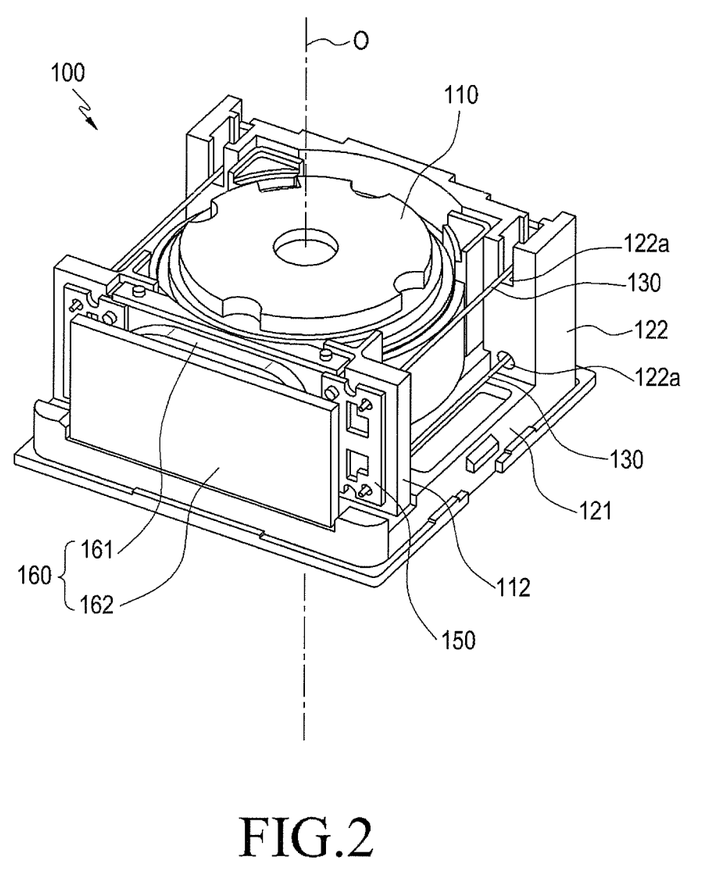
FIG. 2 illustrates perspective view of the camera lens assembly of FIG. 1.

FIG. 1 illustrates an exploded perspective view of a camera lens assembly 100 according to embodiments of the present disclosure. FIG. 2 illustrates a perspective view illustrating the camera lens assembly 100 of FIG. 1. Referring to FIGS. 1 and 2, the camera lens assembly 100 includes a lens module 110, a lens holder unit 120, a wire member 130, a fixing member 140, a wire holder 150, a driving unit 160, and a housing 170. In particular, the wire member 130, the fixing member 140, and the wire holder 150 correspond to a wire module. The wire module resiliently supports the lens module 110 on the lens holder unit 120, dampens an impact generated in a direction perpendicular to an optical axis direction O, such as an impact generated in a lengthwise direction of the wire member 130. The wire module allows a current for driving the lens module 110, that is, a current applied to the driving unit 160, to flow to a circuit board 180. Thus, the camera lens assembly 100 of the present disclosure is configured for at least three functions. First, the lens module 110 is driven in an optical axis direction O on the lens holder unit 120 by applying a current to the driving unit 160, such as, a coil unit 161. Also, the lens module 110, resiliently supported on the lens holder unit 120 by the wire member 130, performs automatic focusing while moving in the optical axis direction O.

One end of the wire member 130 passes through the lens holder unit 120, and is fixed to the fixing member 140 spaced apart from the lens holder unit 120 to face the lens holder unit 120. Accordingly, when the wire member 130 is deformed by an impact generated along a lengthwise direction of the wire member 130, the fixing member 140 is flexibly deformed to dampen an impact of the wire member 130 while minimizing the impact.

The fixing member 140 and the wire holder 150 are provided at opposite ends of the wire member 130, the fixing member 140 is connected to the circuit board 180 such that a current flows between the fixing member 140 and the circuit board 180. The wire holder 150 is connected to the driving unit 160 such that a current flows between the wire holder 150 and the driving unit 160. Accordingly, the wire member 130 has a structure of a power transfer medium through which a current flows between the circuit board 180 and the driving unit 160.

A lens array 111 is provided in the lens module 110, and the lens module 110 is affixed to the lens holder unit 120 to be moved in the optical axis direction O. One surface of the lens module 110 is fitted within the lens holder unit 120, in particular, attached to and facing a side surface 122 of the lens holder unit 120. An opposite surface of the lens module 110 corresponds to a mounting surface 112 to which the driving unit 160 is mounted (that is, physically attached) opposite to the lens holder unit 120, such as, the side surface 122 of the lens holder unit 120. Opposite ends of the wire member 130 are coupled to the mounting surface 112 of the lens module 110 and to the side surface 122 of the lens holder unit 120. Accordingly, if the driving unit 160 is driven, the lens module 110 is resiliently moved by the wire member 130 while being supported by the lens holder unit 120.

Figure 3:
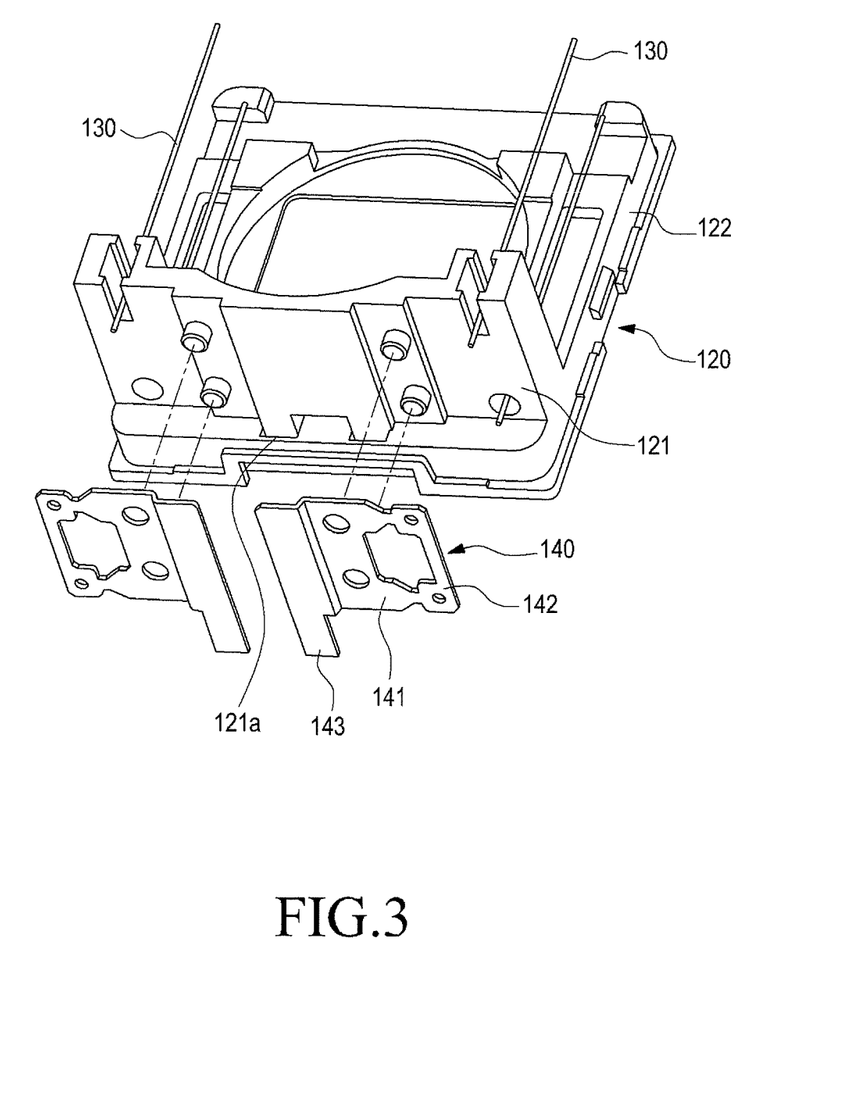
FIG. 3 schematically illustrates a lens holder unit, a wire member, and a fixing member of the camera lens assembly of FIG. 1.
Figure 4:
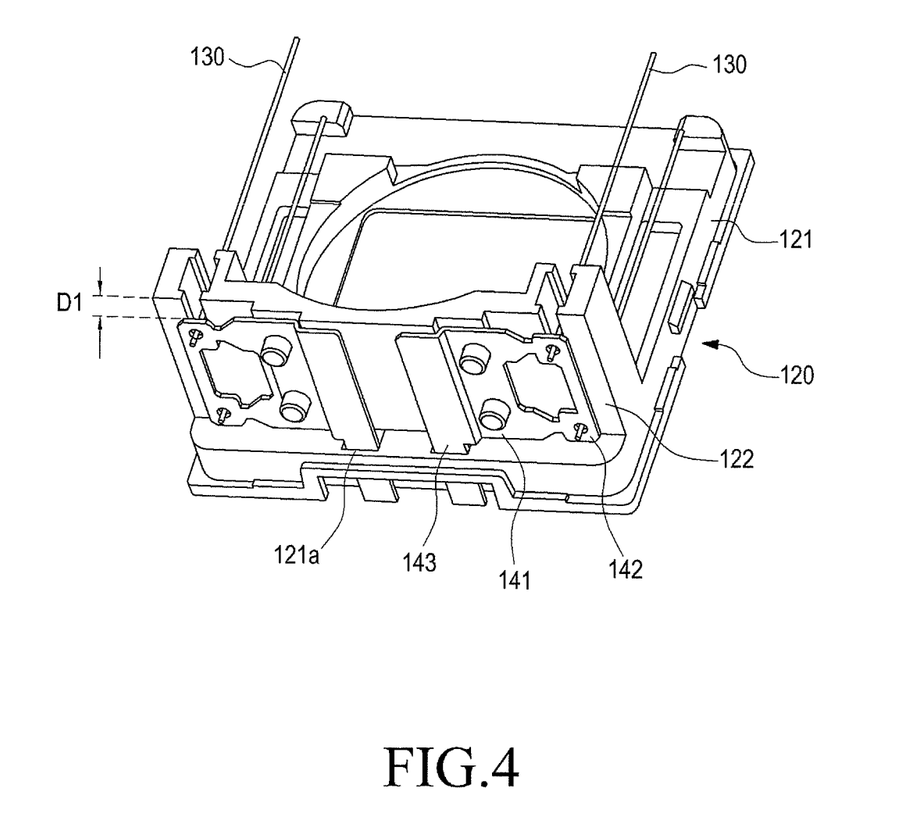
FIG. 4 illustrates a state in which the lens holder unit, the wire member, and the fixing member of FIG. 3 are coupled to each other.

FIG. 3 schematically illustrates only a lens holder unit 120, a wire member 130, and a fixing member 140 of the camera lens assembly 100 of FIG. 1. FIG. 4 illustrates a state in which the lens holder unit 120, the wire member 130, and the fixing member 140 of FIG. 3 are coupled to each other. Referring to FIGS. 3 and 4, the lens module 110 is bound to the lens holder unit 120, and the lens module 110 can be moved in the optical axis direction O on the lens holder unit 120 to perform auto focusing. The lens holder unit 120 morphologically has a bottom surface 121 and a side surface 122. The circuit board 180 connected to a main printed circuit board of a portable terminal, an image sensor provided on the circuit board 180, and the like are mounted to the bottom surface 121 of the lens holder unit 120. The side surface 122 is vertically formed at one upper end of the bottom surface 121, and one surface of the lens module 110 is set to face the side surface 122. In addition, the fixing member 140 is fixed to the outer surface of the side surface 122. A coupling opening 122a, through which one end of the wire member 130 passes, is formed on the side surface 122. A through-hole 121a is formed on the bottom surface 121 such that an extending surface 143 of the fixing member 140 (which will be described below) passes through the bottom surface 121 on the side surface 122 to be connected to the circuit board 180 provided at a lower side of the bottom surface 121 so that a current flows between the extending surface 143 of the fixing member 140 and the circuit board 180.

Figure 5:
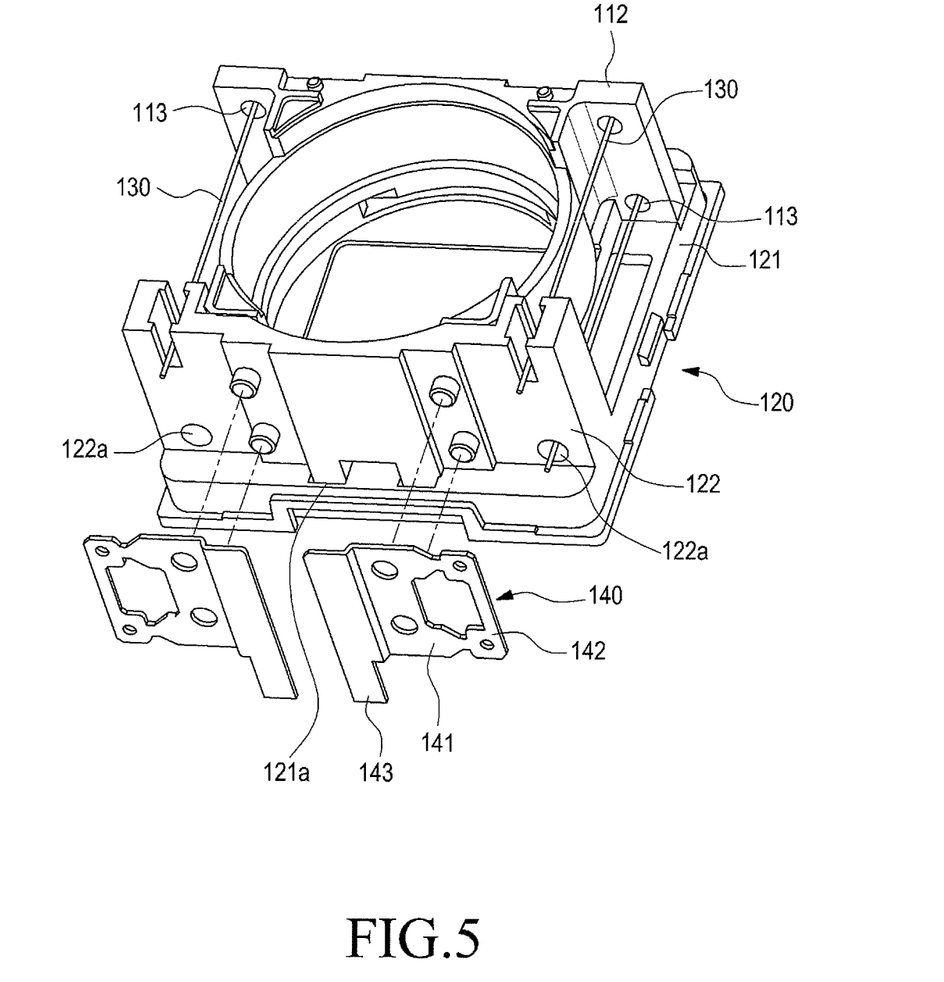
FIG. 5 illustrates a state in which a lens module is mounted to the lens holder unit of FIG. 3.
Figure 6:
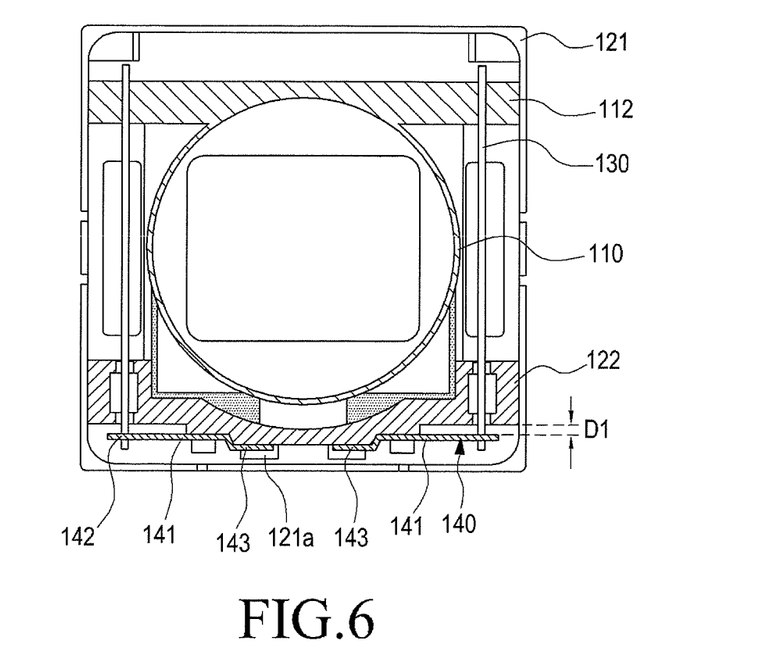
FIG. 6 illustrates a plan view of FIG. 5.

FIG. 5 schematically illustrates a state in which a lens module 110 is mounted to the lens holder unit 120 of FIG. 3. FIG. 6 illustrates a schematic plan view of FIG. 5. Referring to FIGS. 5 and 6, the wire members 130 are disposed opposite to each other on opposite sides of the lens module 110, and connect the lens module 110 and the lens holder unit 120 to resiliently and fixedly support the lens module 110. The opposite ends of the wire member 130 are fixed to the lens holder unit 120 and the lens module 110, respectively. That is, one end of the wire member 130 (which will be described below) passes through the lens module 110, in particular, the mounting surface 112 of the lens module 110 to be fixed to the wire holder 150. An opposite end of the wire member 130 passes through the lens holder unit 120 to be fixed to the fixing member 140. The wire member 130 resiliently supports the lens module 110 on the lens holder unit 120, so that when the lens module 110 is moved in the optical axis direction O by the driving unit 160, auto focusing can be performed as the driving unit 160 is driven. Although the figures show that two pairs of wire members 130 (that is, four wire members 130) are provided on the side surface 122 and on the opposite surface of the lens module 110 in which the driving unit 160 is installed (in particular, on opposite side surfaces of the lens module 110 between the mounting surfaces 112), the present disclosure is not limited the example shown in the figures. For example, the present disclosure can be modified as long, as at least one wire member 130 can be provided on opposite side surfaces of the lens module 110, respectively, to resiliently support the lens module 110 on the lens holder unit 120 so that the lens module 110 is moved in the optical axis direction O by driving the driving unit 160 to perform auto focusing.

Figure 7:
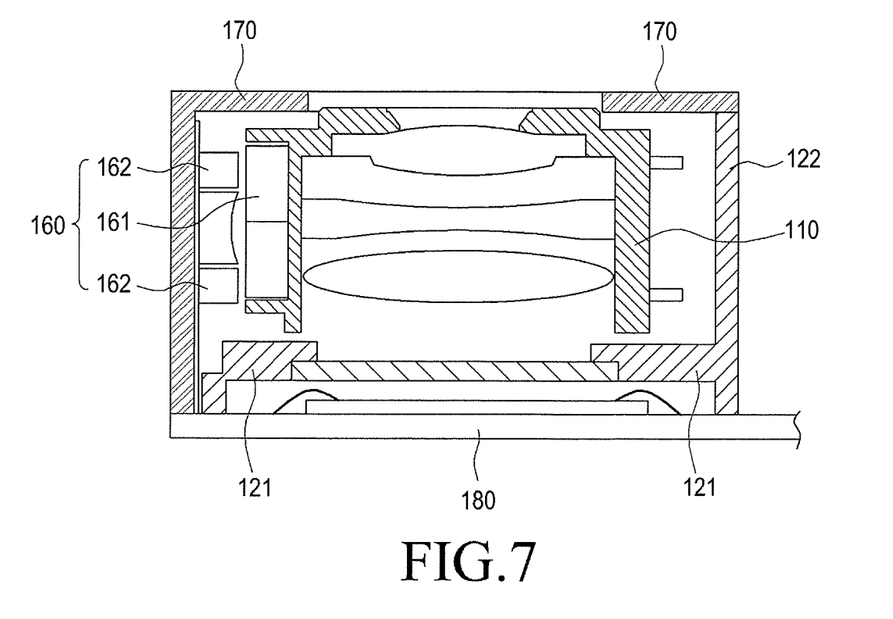
FIG. 7 illustrates a cross-sectional view of FIG. 5.

FIG. 7 illustrates a schematic cross-sectional view of FIG. 5. Referring to FIG. 7, the fixing member 140 and the wire holder 150 are provided in the lens holder unit 120 to which the wire member 130 is fixed. The lens module 110 is also provided to fix the wire member 130. The wire member 130 having passed through the side surface 122 is fixed to the fixing member 140. The fixing member 140 includes a fixing surface 141, a wire fixing surface 142, and a connecting surface 143. The wire fixing surface 142 and the connecting surface 143 extend to opposite side surfaces of the fixing surface 141, and the fixing surface 141 is a portion at which the fixing member 140 is fixed to an outer side of the side surface 122. The wire fixing surface 142 extends from the fixing surface 141 toward the wire member 130, and is spaced apart from the side surface 122 by a specified length D1. The wire fixing surface 142 and the side surface 122 can be spaced from each other, for example, by bending the side surface 122 or bending the wire surface. As an example of the present disclosure, the side surface 122 is bent in the direction of the lens module 110 to be spaced apart from the wire fixing surface 142 forming the same plane as the fixing surface 141 by a specified length D1. A coupling hole 142a aligned with the coupling opening 122a and through which one end of the wire member 130 is fixed is formed on the wire fixing surface 142. The wire fixing surface 142 can be flexibly deflected with respect to the fixing surface 141 in a direction far away from or toward the side surface 122. Accordingly, if an impact is generated in the lengthwise direction of the wire member 130, the wire member 130 is deflected but is deflected in a direction far away from or toward the side surface 122, so that a space having a predetermined length D1 by which the wire member 142 can be moved lengthwise is secured, thereby minimizing a deformation of the wire member 130. Thus, as the wire fixing surface 142 is flexibly moved, an impact generated in the wire member 130 is dampened. The connecting surface 143 extends from a lower surface of the fixing surface 141 toward the bottom surface 121, and passes through the through-hole 121a to be connected to the circuit board 180 such that a current flows between the connecting, surface 143 and the circuit board 180. Accordingly, the circuit board 180, the fixing member 140, and the wire member 130 are connected to each other such that a current flows between the circuit board 180, the fixing member 140, and the wire member 130.

The wire holder 150 is mounted to an outer surface of the lens module 110, in detail, the mounting surface 112, and is mounted at a location spaced apart from opposite side surfaces of the coil unit 161. The wire holder 150 fixes an opposite end of the wire member 130 and is wired to the coil unit 161 mounted to the mounting surface 112 of the lens module 110, and transfers a current applied to the coil unit 161 to the wire member 130. Thus, the wire member 130 functions as a current transfer medium for providing a current transferred through the wire holder 150 to the circuit board 180 through the fixing member 140. That is, the coil unit 161 is electrically connected to the circuit board 180 through the wire holder 150, the wire member 130, and the fixing member 140.

Thus, in the camera lens assembly 100, auto focusing can be performed through the resilient fixing through the wire member 130; an external impact received by the wire member 130 can be dampened through the fixing member 140; and a current applied to the coil unit 161 through the wire holder 150, the wire member 130, and the fixing member 140 can be transferred even to the circuit board 180.

The above-configured camera lens assembly 100 can fix the lens array through the wire fixing module to simplify the camera fixing structure, and perform auto focusing of the lens array by using the wire member 130. Further, the camera lens module 110 can be easily assembled by providing the wire fixing module, reducing manufacturing costs.

Further, an impact absorbing fixing plate is provided at one side of the wire member 130 to absorb an impact generated in a lengthwise direction of the wire, improving reliability against an impact generated in the camera lens module 110 and preventing deformation of the wire due to the impact. Accordingly, reliability against an impact or damage to the wire and the impact absorbing fixing plate can be improved.

In addition, opposite sides of the wire member are connected to the impact absorbing fixing plate and the coil unit and a lower end of the impact absorbing fixing plate is connected to an internal PCB of the camera lens module, allowing the coil unit to be driven and allowing a current generated by driving the coil unit to be transferred to the PCB through the wire member.

Although the present disclosure has been described with an embodiment, various changes and modifications may be suggested to one skilled in the art. It is intended that the present disclosure encompass such changes and modifications as fall within the scope of the appended claims.

What is claimed is:

1. A camera lens assembly comprising:
a lens holder unit;
a lens module coupled to the lens holder unit;
a wire member fixed to the lens holder unit and the lens module, the wire member configured to resiliently support the lens module and to enable the lens module to be driven in an optical axis direction; and
a fixing member coupled to the lens holder unit and configured to fix the wire member and to dampen an impact generated in the wire member due to an impact generated in a direction perpendicular to an optical axis direction,
wherein the wire member is oriented in a direction perpendicular to the optical axis direction, and one side of the wire member is fixed on one side of the lens module and another side of the wire member is fixed on the fixing member.

2. The camera lens assembly of claim 1, wherein the lens holder unit comprises:
a bottom surface provided with an internal circuit; and
a side surface disposed at one side of the bottom surface perpendicular to the bottom surface.

3. The camera lens assembly of claim 2, wherein the fixing member comprises:
a fixing surface fixed to the side surface; and
a wire fixing surface:
extending from the fixing surface to a side surface,
spaced apart from the side surface by a predetermined length to face the side surface, wherein one end of the wire member is fixed to the wire fixing surface, and deflected in a direction away from the side surface with respect to the fixing surface.

4. The camera lens assembly of claim 3, wherein the wire fixing surface is spaced apart from the side surface by bending the side surface.

5. The camera lens assembly of claim 3, wherein the wire fixing surface is spaced apart from the side surface by bending the wire surface.

6. The camera lens assembly of claim 3, wherein when an impact is generated in a lengthwise direction of the wire member:
the wire member resiliently deforms, and
the wire fixing surface deflects in a direction away from or toward the side surface with respect to the fixing surface, the wire fixing surface configured to dampen the impact of the wire member.

7. The camera lens assembly of claim 6, wherein a connecting surface extending from the fixing surface toward the bottom surface is formed in the fixing member, and
wherein the connecting surface is coupled to a circuit board disposed under the bottom surface through a through-hole formed in the bottom surface, and
wherein a current flows between the connecting surface and the circuit board.

8. The camera lens assembly of claim 7, wherein the lens module includes a mounting surface to which a driving unit is attached to face the side surface, and
wherein the wire member connects the mounting surface and the side surface on opposite sides of the lens module with respect to the lens module.

9. The camera lens assembly of claim 8, wherein the driving unit configured to drive the lens module in an optical axis direction is disposed on the mounting surface, and
wherein a wire holder fixing the wire member and wired to the driving unit is attached in physical contact with the mounting surface to be spaced apart from opposite side surfaces of the driving unit.

10. The camera lens assembly of claim 9, wherein when a current is applied to the driving unit, the current is transferred through the wire member fixed to the wire holder and is applied to the circuit board through the fixing member to which the wire member is fixed.

11. The camera lens assembly of claim 1, wherein the wire member comprises two pairs of wire members.

12. A camera lens assembly comprising:
a wire module configured to:
support a lens module such that the lens module is movable in an optical axis direction on a lens holder unit,
dampen an impact generated in a direction perpendicular to the optical axis direction, and
transfer a current applied to drive the lens module to a circuit board, and
wherein the wire module comprises:
a wire member configured to resiliently support the lens module and the lens holder unit,
a fixing member fitted within the lens holder unit and configured to fix one end of the wire member and to dampen an impact of the wire member, and
a wire holder disposed in the lens module and configured to fix an opposite end of the wire member, the wire holder wired to a driving unit, the driving unit configured to drive the lens module.

13. The camera lens assembly of claim 12, wherein the fixing member comprises:
a wire fixing surface fixed to one end of the wire member with respect to a fixing surface, the fixing surface fixed to the lens holder unit and configured to dampen the impact; and
a connecting surface extending and configured to enable a current to flow between the connecting surface and the circuit board.

14. The camera lens assembly of claim 13, wherein a through-hole passing through the connecting surface is formed in the lens holder unit.

15. The camera lens assembly of claim 14, wherein the wire fixing surface is spaced apart from the lens holder unit by a predetermined distance and faces the lens holder unit, and
wherein the wire member passes the lens holder unit and is fixed to the wire fixing surface such that when an impact is applied to the wire member, the wire fixing surface deflects with respect to the fixing surface and dampens the impact of the wire member.

16. The camera lens assembly of claim 12, wherein the wire member comprises two pairs of wire members.

17. The camera lens assembly of claim 12, wherein the wire member is oriented in a direction perpendicular to the optical axis direction, and one side of the wire member is fixed on one side of the lens module and another side of the wire member is fixed on the fixing member.

18. An portable terminal comprising:
a camera lens assembly comprising:
a lens holder unit;
a lens module coupled to the lens holder unit;

a wire member fixed to the lens holder unit and the lens module, the wire member configured to support the lens module and to enable the lens module to be driven in an optical axis direction; and a fixing member coupled to the lens holder unit and configured to fix the wire member and to dampen an impact generated in the wire member due to an impact generated in a direction perpendicular to an optical axis direction, wherein the wire member is oriented in a direction perpendicular to the optical axis direction, and one side of the wire member is fixed on one side of the lens module and another side of the wire member is fixed on the fixing member.

19. The portable terminal of claim 18, wherein the lens holder unit comprises:

a bottom surface provided with an internal circuit; and a side surface disposed at one side of the bottom surface perpendicular to the bottom surface.

20. The portable terminal of claim 19, wherein the fixing member comprises:

a fixing surface fixed to the side surface; and a wire fixing surface:
  extending from the fixing surface to a side surface,
  spaced apart from the side surface by a predetermined length to face the side surface, wherein one end of the wire member is fixed to the wire fixing surface, and
  deflected in a direction away from the side surface with respect to the fixing surface.

* * * * *